(12) United States Patent
Bingham et al.

(10) Patent No.: US 7,725,669 B1
(45) Date of Patent: May 25, 2010

(54) BACKUP AND RESTORE OPERATIONS USING COHERENCY GROUPS FOR ISB PROTOCOL SYSTEMS

(75) Inventors: Scott Forrest Bingham, Sammamish, WA (US); Upanshu Singhal, Redmond, WA (US); Matthew D. Buchman, Seattle, WA (US); Patrick M. Simonich, Kent, WA (US)

(73) Assignee: EMC Corporation, Hopkinton, MA (US)

( * ) Notice: Subject to any disclaimer, the term of this patent is extended or adjusted under 35 U.S.C. 154(b) by 271 days.

(21) Appl. No.: 11/536,157

(22) Filed: Sep. 28, 2006

(51) Int. Cl.
*G06F 12/16* (2006.01)
(52) U.S. Cl. ................................. 711/162; 711/161
(58) Field of Classification Search .................. None
See application file for complete search history.

(56) References Cited

U.S. PATENT DOCUMENTS

| | | | |
|---|---|---|---|
| 6,665,812 B1 * | 12/2003 | Blumenau et al. ............. 714/5 |
| 7,069,277 B2 | 6/2006 | Okada et al. |
| 7,069,401 B1 | 6/2006 | Noonan et al. |
| 7,334,094 B2 | 2/2008 | Fair |
| 7,389,313 B1 | 6/2008 | Hsieh et al. |
| 2003/0093443 A1 * | 5/2003 | Huxoll ...................... 707/204 |
| 2003/0131278 A1 | 7/2003 | Fujibayashi |
| 2003/0225966 A1 | 12/2003 | Frandsen |
| 2005/0165868 A1 | 7/2005 | Prakash |
| 2005/0246503 A1 * | 11/2005 | Fair ........................... 711/147 |
| 2006/0095298 A1 * | 5/2006 | Bina ............................. 705/2 |
| 2006/0253734 A1 * | 11/2006 | Oka ............................. 714/6 |

OTHER PUBLICATIONS

U.S. Appl. No. 11/536,121, filed Sep. 28, 2006, Bingham et al.
U.S. Appl. No. 11/536,130, filed Sep. 28, 2006, Bingham et al.
U.S. Appl. No. 11/536,141, filed Sep. 28, 2006, Bingham et al.
U.S. Appl. No. 11/536,121, filed Oct. 30, 2008, Office Action.
U.S. Appl. No. 11/536,121, filed Apr. 7, 2009, Notice of Allowance.
U.S. Appl. No. 11/536,121, filed Apr. 27, 2009, Supplemental Notice of Allowance.
U.S. Appl. No. 11/536,130, filed Oct. 2, 2008, Office Action.

(Continued)

*Primary Examiner*—Than Nguyen
(74) *Attorney, Agent, or Firm*—Workman Nydegger

(57) ABSTRACT

Systems and methods for performing scheduled backups and recovery of data generated by one or more production applications operating on a MAGIC platform located on two or more host computers in a coherency group. The data for a coherency group is stored in a primary storage in the form of one or more production volumes and ISB protocol is used to create one or more clone volumes. Exemplary methods for backing up one or more clone volumes for a coherency group to a backup storage include copying the one or more clone volumes to a backup storage or creating a snapshot of the one or more clone volumes. The ISB functions of splitting and/or reconnecting the one or more production volumes and one or more clone volumes occur at substantially the same time for all the two or more host computers in the coherency group.

18 Claims, 8 Drawing Sheets

OTHER PUBLICATIONS

U.S. Appl. No. 11/536,130, filed Apr. 7, 2009, Notice of Allowance.
U.S. Appl. No. 11/536,130, May 1, 2009, Supplemental Notice of Allowance.
U.S. Appl. No. 11/536,141, filed Sep. 29, 2008, Notice of Allowance.
U.S. Appl. No. 11/536,141, filed Jan. 8, 2009, Supplemental Notice of Allowance.

* cited by examiner

BACKUP AND RESTORE OPERATIONS USING COHERENCY GROUPS FOR ISB PROTOCOL SYSTEMS

CROSS-REFERENCE TO RELATED APPLICATIONS

This application is related to co-pending U.S. patent application Ser. No. 11/536,121, filed Sep. 28, 2006, co-pending U.S. patent application Ser. No. 11/536,130, filed Sep. 28, 2006, and co-pending U.S. patent application Ser. No. 11/536,141, filed Sep. 28, 2006. All of these applications are incorporated by reference herein in their entireties.

BACKGROUND OF THE INVENTION

1. The Field of the Invention

The present invention relates to systems and methods for backing up and restoring data. More particularly, embodiments of the invention relate to systems and methods for performing replication operations using ISB protocol systems.

2. The Relevant Technology

In this society where many personal and business interactions are data driven, data can become easily lost or corrupted due to events such as system failures, viruses, power outages, etc. Backing up data has become an important feature of computer networks because of this increasing dependence upon computers and networks to perform vital business and personal functions. The ability to easily, accurately and reliably access data is expected by anyone accessing a computer and/or network.

Backup and recovery of data is typically accomplished through the use of software that creates a backup copy of data and that recovers the data from the backup copy. As the amount of data continues to increase, and as the applications for creating data become more complex, backing up and recovering the data becomes more challenging. It would be advantageous to be able to restore the data at optimal points in time so that full recovery of all of the desired data is achieved without corrupting other data or processes on a computer.

In particular, in the health care information system industry, the MAGIC platform, which operates using Integrated Serverless Backup (ISB) protocol, both of which are provided by MEDITECH, allows health care providers to perform basic backups of data. However, it would be advantageous to provide administrators of these health care systems with the ability to perform scheduled backups, recover data at particular points in time, as well as perform other replication operations and recovery operations on saved data.

BRIEF DESCRIPTION OF THE DRAWINGS

To further clarify the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1A:
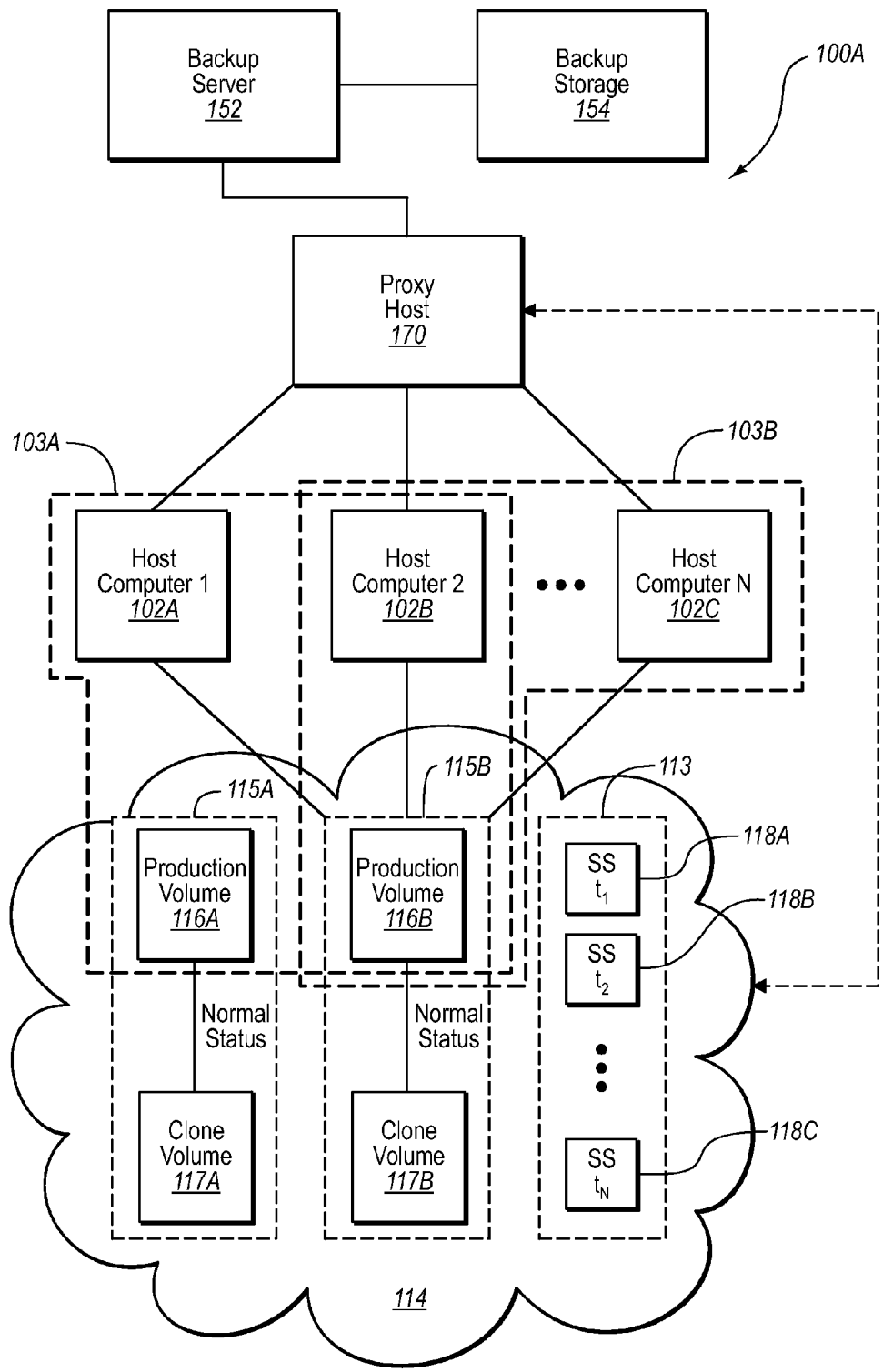
FIG. 1A illustrates an example of a system for performing replication operations using ISB protocol in accordance with one embodiment of the present invention.

In the following detailed description of the various embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The principles of the present invention relate to a system configured for performing backup and restore operations using Integrated Serverless Backup (ISB) protocol to perform replication operations on data generated on a MAGIC platform. Data stored and recovered can be used for backup/recovery operations (e.g., disaster recovery), mirroring functions, data mining, data consistency, as well as other analysis.

Exemplary systems include a production application residing on a host computer and a production volume configured for continually storing changes that occur in the production application. Each time data is written by the production application that is being protected, the production volume is triggered and a copy of the data involved in the read/write operation is created and stored on the production volume. The production volume basically performs a continuous series of write operations. The production volume is able to retain information about every change to a selected application, directory, volume, or the like, over a long period of time, and a user can later utilize the production volume to access stored data. Exemplary systems also include mirroring the data in the production volume using a clone volume.

The present invention is also related to networking a group of host computers into one or more "coherency groups." As used herein, the term "networking" or "coherency group" refers to spreading the functionality of production applications across multiple host computers based on performance requirements where the host computers cooperate to scale and meet performance requirements. A group of host computers that have related applications or business unit functions that share the same data from one or more production volumes is referred to herein as a "network" or "coherency group."

The present invention provides for remote backup of data in clone volumes generated by coherency groups. In addition, the present invention provides for snapshots to be created of the data stored in the production volume or clone volume at various points in time. The snapshots are read-only point-in-time replicas or representations of the original data or contents of one or more volumes. A snapshot can be used to make an actual copy on another local or remote storage device. These snapshots can be recovered at a later time by reading the data for a snapshot created at a particular point in time. Furthermore, numerous snapshots can be saved. Thus, snapshots provide the user with greater control over how data is stored and/or recovered.

As used herein, the term "replication operation" covers various processes for creating a copy of a clone volume. One example of a replication operation includes creating a copy of a clone volume and storing the copy in backup storage. Storing a copy of clone volume is also referred to herein as a "backup" of a clone volume. Another example of a replication operation includes creating a copy of a clone volume in the form of a snapshot and storing the snapshot in a storage device. Thus, a snapshot is considered to be a "backup" of a clone volume. Hence, as used herein, the term "backup" will be used to refer to both storing a copy of a clone volume in backup storage as well as creating a snapshot from a clone volume.

Backup clone volumes and/or snapshots are beneficial, for example, to facilitate data recovery after the occurrence of a disaster. A disaster includes any event in which data is lost or corrupted in any way, or when an operating system or other application is corrupted or damaged in any way that requires the operating system or application to be repaired or reinstalled. Data can be lost, damaged or corrupted in any number of ways, including a system crash, burglary, virus, human error, damage to the system, and the like. A backup clone volume and/or snapshot is stored on a backup storage medium, such as an optical disk, hard disk, floppy disk, tape, or any other storage medium that is physically stored in a location separate from the production volume and accessed to recover the data after the production volume experiences a disaster.

As used herein, the term "data" may include, but is not limited to, directories (e.g., volumes, file systems, and the like), user data, system data, applications, services, operating systems, and the like, that can be stored on one or more storage devices of a computer. Backing up or recovering the operating system may include backing up or recovering any of the data herein defined or understood by those of skill in the art. Data may be organized in logical directories that do not necessarily correspond to a particular storage device. The term "directory" can be used to refer to any means of logically organizing data on a computer.

Even though data may exist on many different storage devices, data can be organized into logical directories and subdirectories so that a user can easily locate information. In one example, in Windows® operating system, the main directories are referred to as volumes. Volumes include, for example, the C drive and D drive, which are typical volumes of storage that are located on a computer, even though the C or D drive itself may comprise a collection of hard disks or a portion thereof. It is not necessary for a user to know from which particular disk to obtain information. Thus, directories exist to help a user navigate through the data on the computer. Other directories may exist to which the computer has access through a network.

For purposes of simplicity, the term "production application" will often be used herein to describe the source of data that is being backed up. As will be described below, complex software applications benefit from the backup and restore technology disclosed herein because the data related to applications are typically subject to constant alteration. The technology disclosed herein facilitates the backup and recovery of all types of data and/or data structures, and can be particularly beneficial to applications whose data is continually changing. Although certain embodiments described herein will often refer to the backup of production applications, the technology described herein applies equally to the backup and recovery of all types of data, including directories, volumes, file systems, servers, user data, system data, services, operating systems, and the like.

Certain embodiments described herein will involve electronic communication between a client computer system (hereinafter referred to as a "client") requesting access to a network service at a server computer system (hereinafter referred to as a "server"). Accordingly, the client sends a request to the server for particular access to its system resources, wherein if the client is authorized and validated, the server responds with a response message providing the desired information. Of course, other messaging patterns between client and server are available, as is well known in the art.

As used herein, the term "user" may refer to a person operating the server (e.g., administrator). Alternatively, the term "user" may refer to a person at a client or management console. Users are able to initiate a request for mirroring, backup and/or restore, although it will be appreciated that the server may have additional functionalities not available to the client or management console.

Exemplary System for Performing Backup/Restore Functions Using ISB Protocol

FIG. 1A illustrates an exemplary system 100A for performing remote backup/recovery functions using ISB protocol systems. FIG. 1A depicts a plurality of host computers 102A, 102B, 102C that, in one embodiment, are networked together into a coherency group. As used herein, the term "networking" or "coherency group" refers to spreading applications across multiple host computers 102A, 102B and/or 102C based on performance requirements where the group of host computers is used to scale and meet performance requirements. A group of host computers 102A, 102B, 102C with related applications or business unit functions that share the same data from one or more production volumes is referred to as a coherency group or network 103.

In FIG. 1A, host computers 102A, 102B, 102C are communicatively coupled to a primary storage 114 which includes one or more storage devices 115A, 115B and 113. Each of storage device 115A, 115B includes a production volume 116A, 116B, respectively, for storing data generated on a MAGIC platform on one or more of the host computers 102A, 102B, 102C. A clone volume 117A, 117B, on each respective storage device 115A, 115B stores a mirror copy of the data of the production volume 116A, 116B, respectively.

FIG. 1A illustrates two examples of embodiments of coherency groups 103A and 103B. In coherency group 103A, host computer 102A and host computer 102B store data on different production volumes 116A and 116B, respectively. For example, host computer 102A may send data relating to a first production application to a first production volume 116A which is used by a second production application on a second host computer 102B to create data which is then stored on a second production volume 116B. In this situation, it would be desirable to be able to quiesce the first production application and the second production application, and create clone volumes 117A, 117B at the same time because of the logical interdependence of the data on the separate production applications and production volumes. Further, a third production application could use the information stored on both the first production volume and second production volume to create records which are stored on yet a third production volume, and so on. Storing and accessing of data from production volumes 116A, 116B can be coordinated by a network management service (described below) located on each host computer.

FIG. 1A further illustrates that, in coherency group 103B host computer 102A, 102B, 102C share data from the same production volume 116B. Thus, each host computer 102A, 102B, 102C in coherency group 103B sends data to be written to production volume 116B as coordinated by a network management service (described below) located on each host computer.

In addition, while not shown, an individual host computer 102A, 102B and/or 102C can create data that is not logically interrelated to data on other production volumes such that the data is not shared or networked with the other host computers.

FIG. 1A also depicts host computers 102A, 102B, 102C being communicatively coupled to a proxy host 170 to allow the proxy host 170 to communicate directly with primary storage 114 (see dashed line). Proxy host 170 is, in turn, communicatively coupled to a backup server 152 which sends backup commands to the proxy host 170 to initiate backup of a coherency group. This process includes the proxy host 170 identifying coherency group configurations to find a list of host computer(s) 102 and production volume(s) 116 in the coherency group. The proxy host 170 initiates an ISB protocol split of the production volume(s) 116 and receive a list of clone volume(s) 117. The clone volume(s) 117 are then backed up, effectively backing up the coherency group.

When backing up a clone volume 117, backup server 152 is communicatively coupled to a backup storage 154 for remotely storing the copy of the clone volume. Proxy host 170 also initiates creation of snapshots 118A, 118B, and/or 118C which are data copied from the clone volume 117 at the same or different points in time. In the embodiment of FIG. 1A, snapshot 118A was generated at time $t_1$ while snapshot 118B was generated at time $t_2$, and snapshot 118C representing other potential snapshots created at various points in time $t_n$. These snapshots 118 can be stored in a different storage device 113 as shown in FIGS. 1A and 1B or can be stored in the same storage device 115A or 115B as production volume 116A, 116B and/or clone volume 117A, 117B (not shown).

Figure 1B:
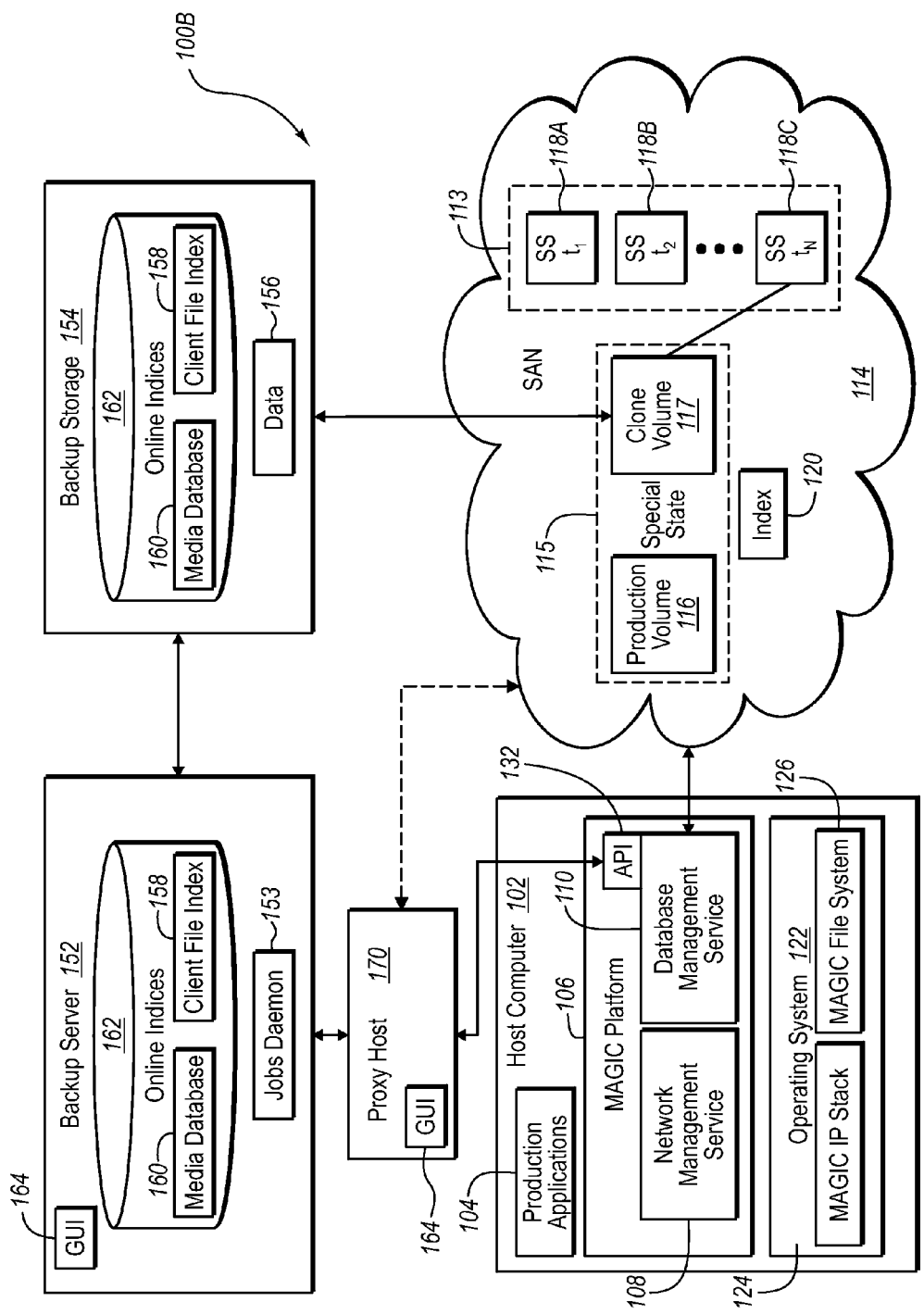
FIG. 1B illustrates another example of a system for performing replication operations using ISB protocol in accordance with one embodiment of the present invention.

Turning now to FIG. 1B, features of system 100A are shown in more detail with reference to system 100B, wherein like elements will be referred to with like reference numerals. As shown in FIG. 1B, for purposes of describing the features of host computer 102A, 102B and/or 102C, a single host computer 102 is depicted. However, the description relating to host computer 102 applies to any of the host computers 102A, 102B, 102C illustrated in FIG. 1A. In addition, a single storage device 115 having a single production volume 116 and clone volume 117 is depicted, but the description of the function of storage device 115 can equally apply to the function of storage device 115A, 115B depicted in FIG. 1A.

In one embodiment, host computer 102 is an individual computer. In another embodiment, host computer 102 is a server that is in communication with a network of client computers (not shown). In another embodiment, host computer 102 is a client computer that is communicatively coupled to a central server (described below). Host computer 102 is relatively simple (e.g., a desktop computer) or relatively complex (e.g., a large database server, a cluster of servers, or a production server).

Host computer 102 includes at least one production application 104, which contains and generates data that can be stored, mirrored, backed up, recovered, data mined, and the like. By way of example only, production application 104 may include applications such as, but not limited to, patient admissions, medical records, laboratory records, pharmacy records, personnel/payroll records, as well as other health care industry-related applications. However, the present invention is not specific to health care industry-related applications and can extend to other enterprises.

Furthermore, as mentioned above, production application 104 and/or production volume 116 may be networked over a coherency group 103 of multiple host computers (e.g., host computers 102A, 102B, 102C of FIG. 1A), volumes, directories, disks, or the like. That is, data from different production application 104 can be stored on different production volumes 116, with the information stored on different production volumes 116 being logically interrelated such that it is desirable to treat the host computers 102 and production volumes 116 together in a coherency grouping 103.

Conversely, individual production applications 104 may be located on distinct host computers 102 so that a host computer is responsible for only certain production applications. That is, the data produced by a production application 104 and stored on a production application 117 may not be related to data stored on any other production volume. For example, FIG. 1A illustrates that coherency group 103A has host computer 102A with a first production application (not shown) storing data on production volume 116A that is networked with host computer 102B having a second production application (not shown) for which data is stored on production volume 116B and a second production application (not shown) for which data is stored on production volume 116A. Meanwhile, coherency group 103B has host computer 102B with a third production application (not shown) storing data on production volume 116B and host computer 102C with a fourth production application (not shown) also storing data on production volume 116B. It is possible that the second production application and third production application located on host computer 102B produces data entirely unrelated to each other, even though the data from the second production application and third production application are both stored on the same production volume 116B. In addition, the foregoing illustrates that multiple production applications 104 can write to the same production volume 116.

As noted above, the term "production application" is merely used by way of example to further illustrate the present invention, because complex applications whose data is continually being altered benefit from the technology disclosed herein. However, other data on host computer 102 may also undergo storing, mirroring, backing up, data mining, and the like, which data may also include directories, volumes, file systems, servers, and other types of data described previously.

Turning back to FIG. 1B, the production application 104 operates on a platform known as the MAGIC platform 106. The MAGIC platform 106 initially evolved from the minicomputer-based MAGIC platform to eventually run on a Windows® platform. The MAGIC platform 106 provides common services to the production application(s) 104 including networking and data storage capabilities that are managed by network management service 108 and database management service 110, respectively.

Network management service 108 facilitates communication between multiple host computers (e.g., host computers 102A, 102B, 102C of FIG. 1A) to coordinate and distribute the functionality of production application 104 across multiple host computers to scale and meet performance requirements of the production application. In addition, network management service 108 communicates with the multiple host computers and database management service 110 to coordinate the storing and/or accessing of data related to the distributed production application 104 in one or more production volumes 116. Thus, multiple host computers 102 can access the same production volume 116 to enable operations related to the production application 104 located on that particular host computer.

The database management service 110 organizes the storage of data for production application 104 into primary storage 114. Thus, the storage devices 115 and 113 in primary storage 114 contain data relating to the production application 104 and/or MAGIC platform 106. Database management service 110 facilitates communication between the host computer 102 and storage device 115. Production volume 116 records a copy of all changes made to the data of production application 104. As production application 104 receives or transmits input/output operations, which is only one example of generating data, the input/output data is recorded by production volume 116. In one embodiment, the input/output data is sent from production application 104 to production volume 116. In an alternative embodiment, data is first sent to database management service 110 which relays the input/output data to production volume 116.

In one embodiment, the production volume 116 is organized into segments, each segment comprising a range of blocks containing production application data. Each segment is configured to failover. Other configurations for production volume 116 would be understood to those of skill in the art.

In addition, the database management service 110 performs basic data storage functions between host computer 102 and primary storage 114. The database management service 110 conventionally provided users with a mechanism to request replication of the production volume 116 in primary storage 114 in the form of one or more clone volumes 117. As shown in FIG. 1A, the production volume 116 and clone volume 117 are connected while data is being copied from a production volume 116 to clone volume 117 (i.e., a normal state). The foregoing configuration provides the ability to mirror data from the production volume 116 to the clone volume 117. This configuration provides multiple layers of redundancy where data is lost or corrupted. If the production volume 116 fails, the clone volume 117 is able to restore the data to the same or another production volume 116. In contrast, as depicted in FIG. 1B, the connection between a production volume 116 and clone volume 116 is temporarily severed (i.e., a special state) to perform other replication functions. This splitting of the production volume 116 and clone volume 117 between normal state and special state is accomplished using ISB protocol.

Primary storage 114 includes an index 120 for recording metadata containing information about the contents of the production volume 116 and clone volume 117. Each storage array or device 115 must be aware of any relationship that it is maintained between a production volume 116 and a clone volume 117, and the index 120 provides a mechanism whereby a user can query that relationship. As shown in FIGS. 1A and 1B, primary storage 114 can be connected to a single or multiple host computers 102 as well as other servers used for other purposes.

In FIGS. 1A and 1B, primary storage 114 is depicted as a storage area network (SAN). For example, primary storage 114 is a CLARiiON storage cluster comprising one or more storage devices 115A, 115B and/or 113, each of which may or may not be located at the same location, and may or may not be networked together. The CLARiiON environment permits SAN Copy Sessions to be created, the SAN Copy Sessions being one example of a snapshot 118. In another embodiment, the primary storage 114 includes one or more Symmetrix servers.

Broadly, primary storage 114 is one of many storage mediums that are commonly employed in the art to store data. Examples include, but are not limited to, disk storage (e.g., optical disks, hard disks, RAIDs, floppy disks, zip disks, and the like), tape storage (e.g., magnetic tape, paper tape), solid state memory devices (e.g., flash memory, EEPROM, and the like), as well as any other storage medium currently known in the art or developed in the future. In embodiments where the primary storage 114 stores data on disk rather than on tape storage, this allows files or entire volumes to be easily surfaced and copied to another location (e.g., a different storage device within primary storage 114 or a different storage network altogether) for performing other functions on the data such as backup/recovery, data mining or data consistency analysis.

Turning back to the description of host computer 102 illustrated in FIG. 1B, the MAGIC platform 106 operates on an operating system 122. In one embodiment, the operating system 122 is modified so that some of the components are replaced by components of the MAGIC platform. For example, as shown in FIG. 1B, the operating system 122 could include a MAGIC IP Stack 124 and a MAGIC File system 126. The operating system 122 can be any operating system known in the art. In one embodiment, the operating system is a Windows® operating system.

The operating system 122 boots off of the local hard drive and cannot access the MAGIC platform 106 or production application 104. In contrast, the MAGIC platform 106 and production application 104 boots off of production volume 116 in the primary storage 114. Thus, the production volume 116 represents a large amount of data that is unavailable for desirable replication operations. Further, the conventional database management service 110 on MAGIC platform 106 that controls the creation of the production volume 116 and clone volume 117 lacks various desirable replication operations, including, but not limited to, snapshot management, snapshot rotation policies, advanced indexing, high speed parallelism, automated media management, LAN-free backup, cluster awareness, and dynamic tape drive sharing. These and other features would be desirable when performing backup/recovery operations on data for production applications 104 and/or data relating to the MAGIC platform itself.

To overcome these deficiencies, as shown in FIGS. 1A and 1B, proxy host 170 and backup server 152 are provided to perform backup/recovery functions. The proxy host 170 uses the ability of the production volume 116 and clone volume 117 to be temporarily severed from a "normal state" to a "special state" in order to perform other replication functions. After severing has occurred, proxy host 170 directly communicates with primary storage 114 (as shown by the dashed line) to initiate a remote backup/recovery of the clone volume 117 to or from backup storage 154 or to create snapshots 118 of the clone volume 117 in the primary storage 114 at time $t_n$. Thus, in the event that the storage device 115A, 115B crashes, the data is recovered from backup storage 154 and/or snapshots 118.

Snapshots 118 reside on local or remote storage arrays 113 and can be used for quick recovery and disaster recovery. Using snapshots 118 can result in less downtime compared to other remote backup options, such as tape-based restore, which is one example of how backup storage 154 can be used. In the embodiment of FIGS. 1A and 1B, snapshots 118 are shown stored on storage device 113, which is part of the primary storage 114 but located at a different location than storage device 115A, 115B. Thus, the snapshots 118 located on a different storage device than production volume 116 and clone volume 117 provide an added level of protection for keeping data secure. In one embodiment, the snapshot 118 is a block level copy (i.e., raw data) of a production volume 116 or clone volume 117. In one embodiment, more than one snapshot 118 is generated at different times from the production volume 116 so that snapshots exist at various points in time.

Thus, in one embodiment, the request for creating a backup of clone volume 117, and/or generating snapshots 118 is generated by backup server 152, for example, using a jobs daemon 153 residing on backup server 152. The backup server 152 may further be configured for controlling other backup operations. For example, the backup server 152 may control and direct all automated, server-initiated backup operations or processes, while the proxy host 170 may control ad hoc backup and recovery operations. It will be appreciated that the backup server 152 may have additional functionalities not available to the proxy host 170, such as those listed above.

In FIGS. 1A and 1B, the backup server 152 communicates with backup storage 154 where one or more copies of clone volume 117 can be stored. The backup storage 154 can be located at the backup server 152 or may be distinct and separate from the backup server 152. The data 156 at backup storage 154 represents one or more copies of the clone volume 117 that has been backed up by the backup server 152 on the backup storage 154. The data 156 may include data obtained from the primary storage 114, or may also include other data, such as the data stored on host computer 102, as well as data from other sources.

The backup server 152 may also store and manage a client file index 158 and a media database 160 on the backup server 152 itself and/or the backup storage 154. The client file index 158 is an index of the backed up data items. The media database 160 is an index of the backup volumes. The client file index 158 and the media volume 160 will be collectively referred to herein as the online indices 162. However, it will be appreciated that other operating systems may use similar data structures for maintaining the directories and backed up items in order to restore the directories and items during recovery. While snapshots 118 are only stored in primary storage 114, the online indices 162 may also store media database entries and file indexes of snapshot copies 118 which can be browsed to facilitate locating snapshot copies 118 in primary storage 114 for recovery or other replication operations.

Backup server 152 and proxy host 170 include a graphical user interface 164 that is configured to display source of data (i.e. host computers 102) and/or the contents of primary storage 114 in an organized manner, such as by displaying volumes in a hierarchical structure. With regard to displaying the source of data, the graphical user interface 164 can display an identification number for a host computer 102 along with the associated production volumes 116 relating to that host computer. The graphical user interface 164 may also be used to display coherency groups 103 and the production volume(s) 116 related to that coherency group. For a given system, multiple coherency groups may exist where a host computer 102 belongs to more than one coherency group. In this case, a host computer 102 may have more than one production application operating thereon, each production application being associated with a different network 103. It is not necessary that a user know exactly which host computer that data is being backed up or recovered from. Rather, host computers 102 can be identified in terms of their coherency groups, in which case, the graphical user interface 164 may display coherency groups 103 instead of host computer identification information, the user being able to select one or more coherency groups.

Graphical user interface 164 may also allow the user to configure primary storage 114 to ensure that the primary storage has sufficient storage allocated to protect a particular volume, directory, or application. The graphical user interface 164 is configured to allow a user to initiate backup operations for clone volumes 117 and/or generate snapshots 118 and determine where the data will be stored. The graphical user interface 164 is further used during a recovery operation to select one or more backup clone volumes 117 and/or snapshots 118 and to direct how the recovery operation should occur.

The backup operations performed by the backup server 152 on the data of host computer 102 are typically performed automatically in accordance with a schedule established by a user. However, a user may initiate ad hoc backup operations directly from the proxy host 170 and/or backup server 152. Further, recovery operations can be performed from proxy host 170 and/or backup server 152.

As further depicted in FIGS. 1A and 1B, a proxy host 170 initiates ISB protocol operations such as splitting the production volume 116 and clone volume 117 between "normal state" and "special state" which then enables the proxy host 170 to communicate directly with primary storage 114 (see dashed line) to perform a backup of a clone volume 117 or generate one or more snapshots 118. While proxy host 170, backup server 152, and backup storage 154 are shown as separate hardware devices, in one embodiment, aspects of the proxy host 170, backup server 152 and/or backup storage 154 can be combined into the same hardware device.

In one embodiment, a replication API 132 is installed on the MAGIC platform 106 to allow the proxy host 170 to communicate with the MAGIC platform 106 and access ISB functionalities provided by the database management service 110 in order to perform backup/recovery operations on data related to the MAGIC platform 106, including the production application 104. For example, through backup server 152, a user requests a backup of clone volume 117, which is relayed to proxy host 170. Proxy host 170 communicates with replication API 132 to request quiescing or suspending of the subsystems (including production application 104) and splitting of production volume 116 and clone volume 117 from normal state to special state in order to accomplish this replication operation.

In one embodiment, backup of a clone volume 117 and/or creation of a snapshot 118 occurs while the appropriate protection sets are in an application consistent state. This may be accomplished by quiescing the production application 104 related to the relevant protection sets prior to performing the replication operation. As such, copies of clone volume 117 and/or snapshots 118 that reflect an "application consistent state" allow critical components of the production application 104 and/or MAGIC platform 106 to be backed up and recovered as a consistent unit. Further, a backup of a clone volume 117 and/or snapshot 118 can further be ensured of being in an application consistent state by severing the connection between a production volume 116 and clone volume 117 while performing the replication operation.

As previously mentioned, the backup of clone volume 117 and/or snapshots 118 is used to recover data that has been lost during a disaster, as well as for other replication operations such as perform mirroring operations, data mining, data consistency checking, and the like.

Exemplary Software Architecture for Proxy Host

Figure 2:
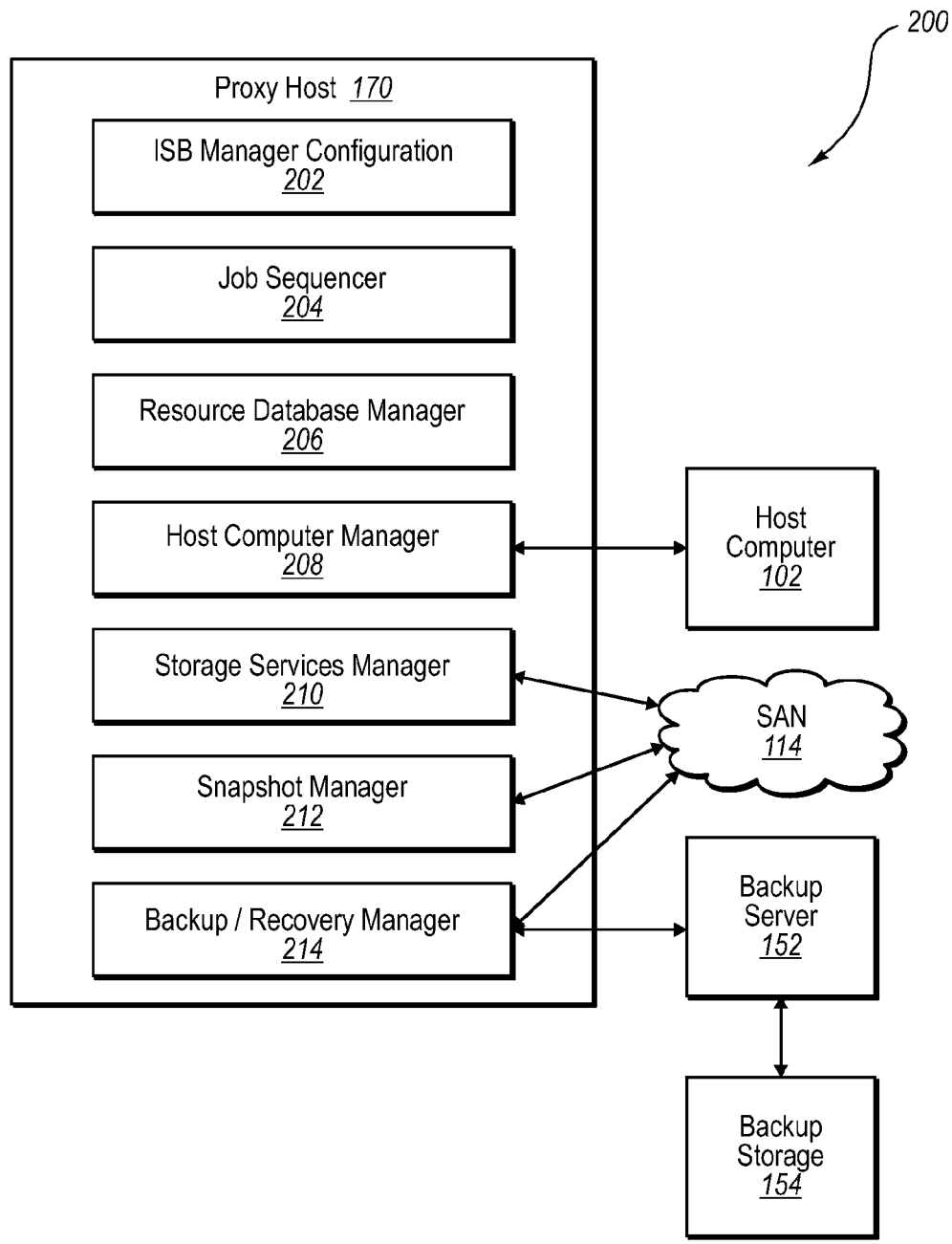
FIG. 2 illustrates an example of system and software architecture for performing replication operations using ISB protocol in accordance with one embodiment of the present invention.

With reference to FIG. 2, a system and/or software architecture 200 is illustrated in further detail, wherein like elements with regard to FIGS. 1A and 1B will be referred to with the same reference numeral. System 200 illustrates an exemplary software architecture that operates on backup server 152, proxy host 170, and/or host computer 102 in further detail.

As shown in FIG. 2, proxy host 170 includes an ISB manager configuration 202. The ISB manager configuration 202 is configured to map one or more production volumes 116 into a logical protection set for a replication operation initiated by proxy host 170. In one embodiment, the logical protection set may be a coherency grouping 103. It will be appreciated that the one or more production volumes 116 might all be attached to one host computer 102 (FIG. 1B) or portions of the production volumes 116 might be distributed among different host computers 102A, 102B, 102C (FIG. 1A). Furthermore, snapshots 118 can be created at different times for each protection set of production volume(s).

Proxy host 170 also includes a job sequencer 204 that coordinates the communications between the various modules in proxy host 170 to perform a replication operation. Resource database manager 206 communicates with the ISB manager configuration 202 to identify production volumes 116 and/or clone volumes 117 related to the replication operation. Host computer manager 208 communicates with the host computers 102 to initiate ISB functions of splitting a production volume 116 and clone volume 117. Storage services manager 210 communicates with the primary storage 114 to prepare a clone volume 117 for surfacing and mounting. Surfacing a clone volume 117 involves exposing a clone volume 117 on the primary storage 114 so that the proxy host 170 can recognize the clone volume in its directories to allow storage services manager 210 to select the clone volume 117 for replication operations. Mounting involves assigning a drive letter to the surfaced clone volume 117 to allow a user to browse the clone volume 117 for accessing files, directories, etc.

Snapshot manager 212 communicates with primary storage 114 to generate snapshots of a clone volume 117. Backup and recovery manager 214 facilitates backup and recovery operations that involve backup storage 154 or other storage devices that are remote from the production volume 116 and clone volume 117 (e.g., storing a snapshot 118 on a different storage device 113 than storage device 115A, 115B).

Exemplary Replication Operations

Figure 3:
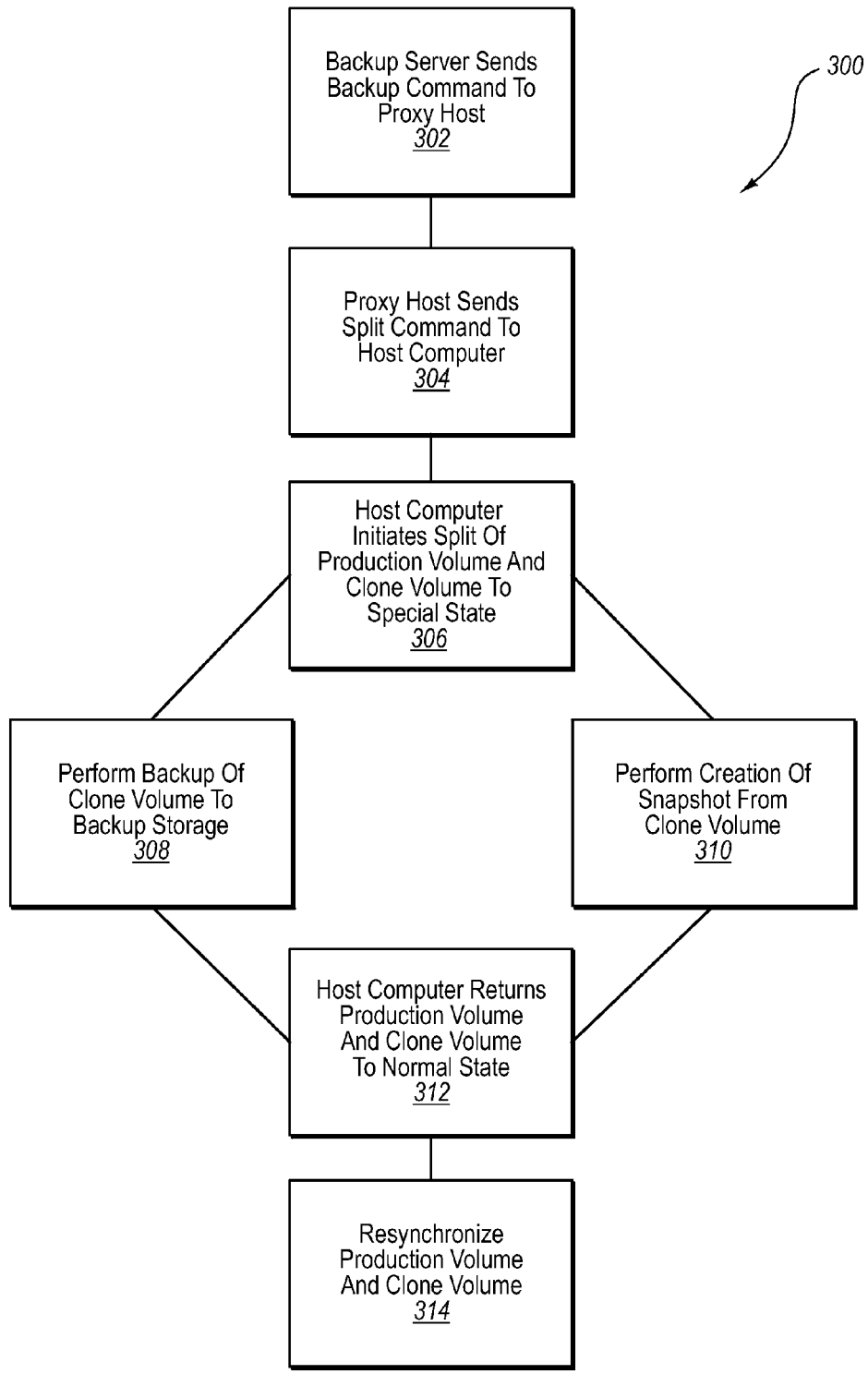
FIG. 3 illustrates an example of a method for performing replication operations using ISB protocol in accordance with one embodiment of the present invention.

FIG. 3 illustrates an overview of an exemplary method 300 for performing a backup of data located in the primary storage 114. As discussed above, coherency groups 103 can be configured to include one or more production volumes. For purposes of describing the replication operations of the present invention, the production volumes will need to be split from their respective clone volumes at substantially the same time in order for the data to be consistent across clone volumes in the coherency group. Thus, the process for backing up all of the production/clone volumes in a coherency group will be very similar. Where the following description of replication operations describes backup of a single clone volume, it should be construed that a similar process is occurring on each clone volume in a coherency group, although not necessarily at exactly the same time. Similarly, where the following description of replication operations attempts to address the situation where multiple production/clone volumes may be included in a coherency group and should not be construed to imply that a coherency group must have multiple production/clone volumes.

At 302, backup server 152 sends a backup command to proxy host 170. The proxy host 170 identifies one or more coherency groups 103 associated with the backup command along with the host computers 102 related to the coherency groups 103. This also identifies to proxy host 170 the production volumes 116 and/or clone volumes 117 involved in the replication operation. At 304, proxy host 170 sends a split command using ISB protocol to the identified host computers 102 to split any production volume 116 and clone volume 117 associated with the coherency group.

In one embodiment, proxy host 170 coordinates the splitting of the production volumes 116 and clone volumes 117 associated with the coherency group 103. In one embodiment, each of the production volumes 116 should receive a split command from each of the host computers 102 in the coherency group 103 since each of the host computer 102 can independently communicate with the production volume. Thus the host computer manager 208 of the proxy host 170 communicates with the network management service 108 of each of the host computers 102 in the coherency group to so that they issue a split command to the production volume 116 at substantially the same time.

In the special state, a host computer 102 can continue to write to a production volume 116. If a coherency group 103 in a backup protection set includes more than one production volume 116, and the split in the production volume occurs at different times, the data in the clone volumes will not be consistent. Preferably, the split occurs of each of the production volumes 116 at substantially the same time.

It may also be desirable for the production applications 104 on each host computer 102 to quiesce, in which case, the proxy host 170 coordinates quiescing of the production application to occur on each of the host computers 102 of the coherency group 103 at substantially the same time.

At 306, each host computer 102 initiates splitting of the production volumes 116 and clone volumes 117 to render the production volumes and clone volumes in a special state. As mentioned above, the proxy host 170 can coordinate splitting of the production volumes and clone volumes and/or quiescing of the production applications on the host computers 102 in the coherency group 103 to occur at substantially the same time so that the data in the clone volumes 117 is consistent.

At 308, proxy host 170 performs a backup of one or more clone volumes 117 to backup storage 154. Alternatively, at 310, proxy host 170 generates a snapshot 118 of one or more clone volumes 117 and stores the snapshot in a storage device 113 which can be the same or different storage array as the storage device 115A, 115B. Thus, as used herein, the term "backup" broadly refers to various methods for creating duplicate copies of data stored in one or more production volumes 116 at a particular point in time, which exemplarily include copying one or more clone volumes 117 to a remote storage 154 or generating a snapshot 118 of one or more clone volumes.

At 312, the proxy host 170, using ISB protocol, directs the host computers 102 in the coherency group 103 to return the production volumes 116 and clone volumes 117 back to their connected, normal state. In one embodiment, each of the host computers 102 sends the reconnect command at substantially the same time. At 314, the host computers 102 resynchronize the data on production volumes 116 and clone volumes 117.

Figure 4:
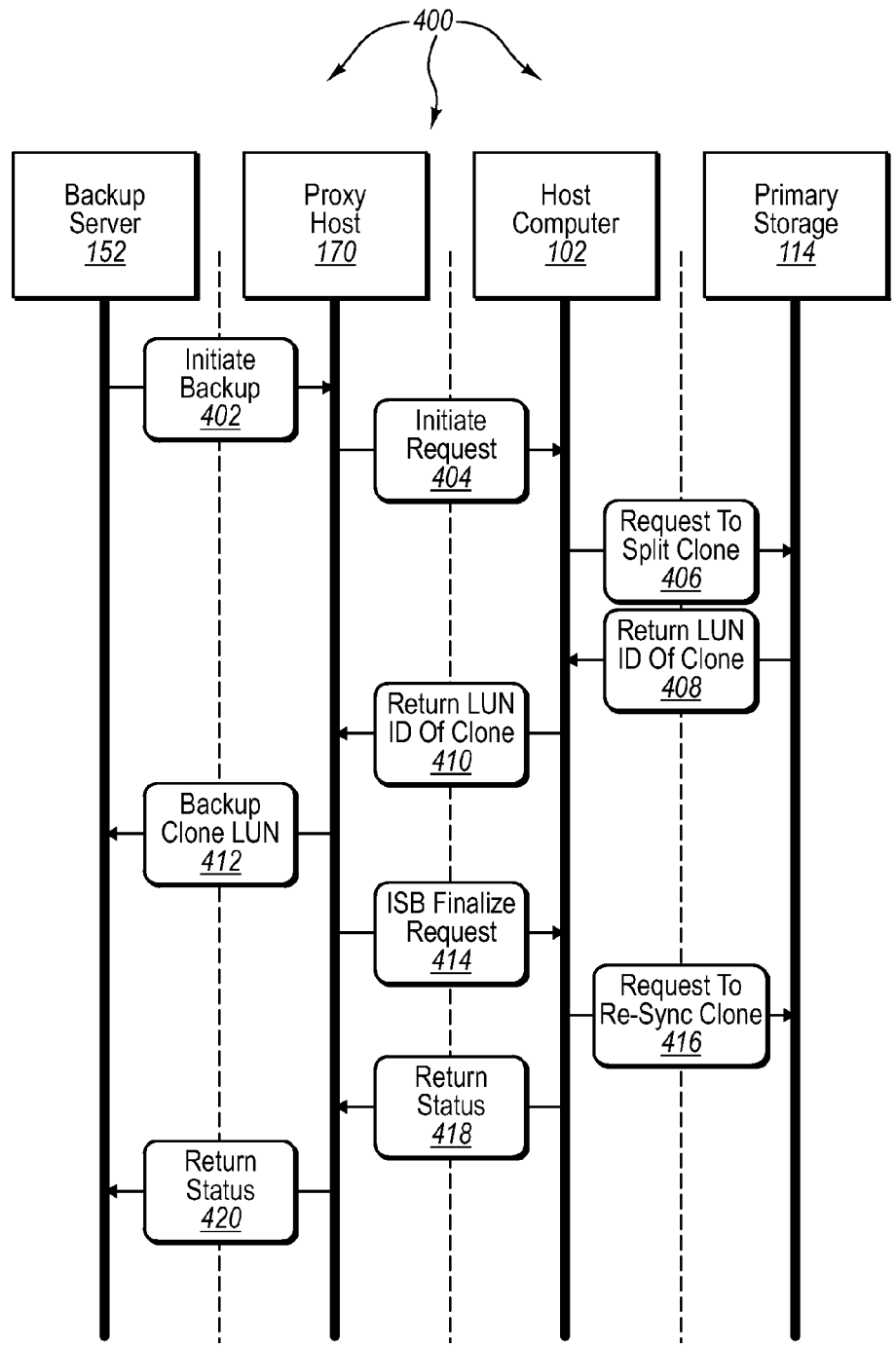
FIG. 4 illustrates an example of a method for backing up a clone volume using ISB protocol in accordance with one embodiment of the present invention.

In further detail, FIG. 4 illustrates an exemplary method 400 for performing a backup of clone volume 117 to remote storage 154. At 402, backup server 152 initiates a backup. This includes backup server 152 passing an initiate backup command to proxy host 170 that includes client settings that identify the name of a group or network 103. The proxy host 170 looks up the group name using the ISB manager configuration 202 (see FIG. 2) to get the identity of host computers 102 attached to the group 103. The data structure of the initiate backup command includes the type of backup operation to perform (e.g., backup to remote storage 152 or create snapshot 118).

At 404, the proxy host 170 initiates splitting of any production volumes and clone volumes related to the group 103. The proxy host 170 identifies which production volumes 116 and/or host computers 102 are related to the protection set to be backed up. Identifying the production volumes 116 includes communicating with ISB manager configuration 202 located on the proxy host 170. In one embodiment, job sequencer 204 on the proxy host 170 sends a command to resource database manager 206 to obtain the identification of the host computers 102 associated with the backup command. This includes identifying one or more host computers 102 that are associated with a coherency group 103. The resource database manager 206 communicates with the ISB manager configuration 202 to obtain the information about production volumes 116 related to the identified host computers 102, which includes, but is not limited to, the one or more storage devices 115 located in primary storage 114 (e.g., CLARiiON ID number), the serial number and/or LUN number of the production volumes 116. The job sequencer 204 receives the production volume 116 information from resource database manager 206. The job sequencer 204 passes the production volume 116 information to the host computer manager 208 to identify which production volumes 116/clone volumes 117 to split. A MAGIC IP coordinator in the host computer manager 208 creates ISB worker threads which are sent to the host computers 102 related to the production volumes 116 to identify the production volumes 116 to split.

At 406, the host computers 102 respond with at least one production volume 116 and initiates splitting of the production volumes 116 with clone volumes 117. In one preferred embodiment, the host computers 102 in the coherency group 103 initiate quiescing of their production applications 104 at substantially the same time. In addition, preferably, the host computers 102 in the coherency group 103 initiate splitting at substantially the same time. Thus, in the primary storage 114, the connections between the production volumes 116 and clone volumes 117 are temporarily severed into a special state. While the connection is severed, the host computer 102 is still able to perform read/write operations to the production volume 116.

At 408, after the split is completed, the storage devices 115 containing the production volumes 116 and/or clone volumes 117 return the identification of the clone volumes 117 to the host computers 102. This includes information that allows the host computers 102 to uniquely identify the location of clone volumes 117 within primary storage 114 as well as the MAGIC database/segment name to be backed up. For example, in a CLARiiON system, the identification information for the clone volume 117 can include the CLARiiON ID number of the storage device 115 and the LUN number of the clone volume 117.

At 410, host computers 102 report back to the proxy host 170 that the split was successful and provides the identification information of the clone volumes 117 and the MAGIC database/segment name to be backed up. This information is received by the MAGIC ISB coordinator on the host computer manager 208, which allows the host computer manager 208 to create a backup work list of clone volumes 117 that is backed up per a successful split from their respective production volumes 116. The host computer manager 208 sends the backup work list to the job sequencer 204.

The job sequencer 204 prepares to perform a backup of the clone volumes 117 identified in the backup work list. This includes surfacing and mounting the clone volumes as described above. The job sequencer 204 sends a surface and mount command to storage services manager 210, including the backup work list. The storage services manager 210 accesses the primary storage 114 and maps the clone volumes 117. This includes accessing index 120 located at primary storage 114. The storage services manager 210 returns a mount map to the job sequencer 204. After receiving the mount map, the job sequencer 204 sends a persistent backup command to the backup and recovery manager 214. The backup and recovery manager 214 has a coordinator that initiates a backup job for each item included on the backup work list.

At 412, backup and recovery manager 214 performs a backup of each clone volume 117 to backup server 152, which directs saved data to backup storage 154. Backup and recovery manager 214 communicates with backup server 152 to provide identification information of each clone volume 117 to be copied and saved as well as facilitating the connection between the proxy host 170 and primary storage 114.

At 414, the proxy host 170 prepares to finalize the ISB backup process. The backup and recovery manager 214 at the proxy host 170 receives the backup report and forwards the report to job sequencer 204. Job sequencer 204 sends a command to host computer manager 208 to reestablish the connection between the production volumes 116 and clone volumes 117, along with the backup report. The MAGIC ISB coordinator in the host computer manager 208 sends a reconnect command to the host computers 102.

At 416, the host computers 102 send a request to primary storage 114 to resynchronize the production volumes 116 and clone volumes 117. Preferably, the resynchronize request sent from the host computers 102 in the coherency group 103 are sent at substantially the same time. The database management service 110 on the MAGIC platform 106 of the host computers 102 initiates reconnection between the production volumes 116 and clone volumes 117 back to a normal state and performs synchronization of any new data on the production volumes 116 that occurred during the backup operation to the clone volumes 117.

At 418, after synchronization is initiated, the host computers 102 return the status to the proxy host 170. This includes sending a report to the host computer manager 208 on the proxy host 170 that the synchronization is underway.

At 420, the proxy host 170 returns the status of the synchronization to the backup server 152.

Figure 5:
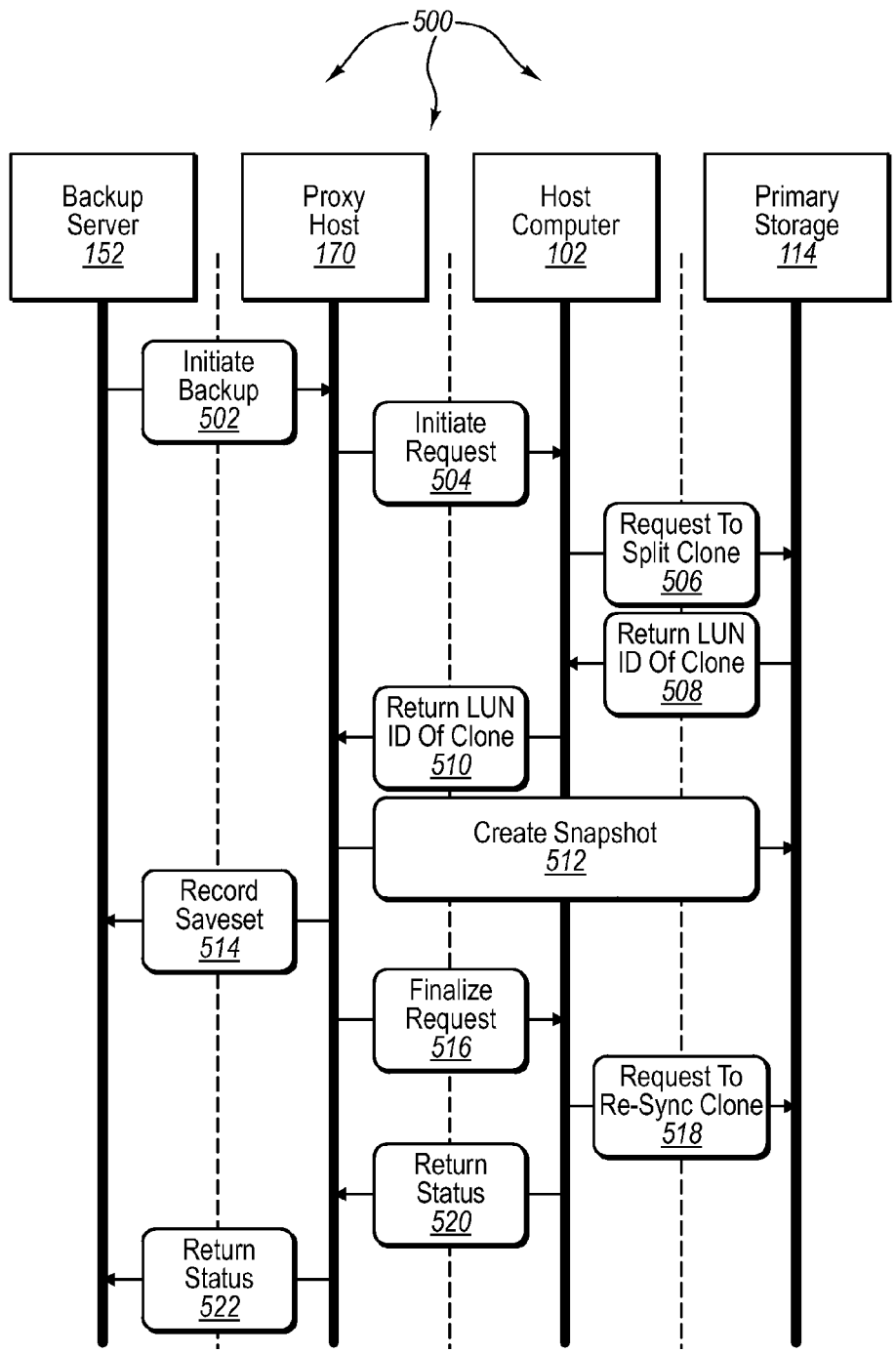
FIG. 5 illustrates an example of a method for creating a snapshot using ISB protocol in accordance with one embodiment of the present invention.

FIG. 5 illustrates an exemplary method 500 for creating a snapshot 118 of a clone volume 117 located in primary storage 114. Since a coherency group 103 can include more than one production volume 116, a snapshot 118 can thus include a copy of more than one clone volume 117. Alternatively, multiple snapshots can be saved, each of which includes a copy of one of the clone volume 117 included in a coherency group. Further, a replication operation may include a combination of these where a user identifies a snapshot as including all of the clone volumes 117 in a coherency group, but the process actually separates the copying of clone volumes 117 into distinct snapshots. Other configurations are also possible. Where the following description describes saving a snapshot to a snapshot storage space, it will be appreciated that the snapshot storage space can hold a copy of one or more clone volumes 117.

At 502, backup server 152 initiates a backup. This includes backup server 152 passing an initiate backup command to proxy host 170 that includes client settings that identify the name of a group or network 103. The proxy host 170 looks up the group name using the ISB manager configuration 202 (see FIG. 2) to get the identity of host computers 102 attached to the group 103. Thus, the data structure of the initiate backup command includes the type of backup operation to perform (e.g., backup to remote storage 152 or snapshot copy to primary storage 114).

At 504, the proxy host 170 initiates splitting of any production volumes and clone volumes related to the group 103. The proxy host 170 identifies which production volumes 116 and/or host computers 102 are related to the protection set to be backed up. Identifying the production volumes 116 includes communicating with ISB manager configuration 202 located on the proxy host 170. In one embodiment, job sequencer 204 on the proxy host 170 sends a command to resource database manager 206 to obtain the identification of the host computers 102 associated with the backup command. This includes identifying one or more host computers 102 that are associated with a coherency group 103. The resource database manager 206 communicates with the ISB manager configuration 202 to obtain the information about production volumes 116 related to the identified host computers, which includes, but is not limited to, the one or more storage devices 115 located in primary storage 114 (e.g., CLARiiON ID number), the serial number and/or LUN number of the production volumes 116. The job sequencer 204 receives the production volume 116 information from resource database manager 206. The job sequencer 204 passes the production volume 116 information to the host computer manager 208 to identify which production volumes 116/clone volumes 117 to split. A MAGIC IP coordinator in the host computer manager 208 creates ISB worker threads which are sent to the host computers 102 related to the production volumes 116 to identify the production volumes 116 to split.

At 506, the host computers 102 respond with at least one production volume 116 and initiates splitting of the production volumes 116 with clone volumes 117. In one preferred embodiment, the host computers 102 in the coherency group 103 initiate quiescing of their production applications 104 at substantially the same time. In addition, preferably, the host computers 102 in the coherency group 103 initiate splitting at substantially the same time. Thus, in the primary storage 114, the connections between the production volumes 116 and clone volumes 117 are temporarily severed into a special state. While the connection is severed, the host computer 102 is still able to perform read/write operations to the production volume 116.

At 508, after the split is completed, the storage devices 115 containing the production volumes 116 and/or clone volumes 117 return the identification of the clone volumes 117 to the host computers 102. This includes information that allows the host computers 102 to uniquely identify the location of clone volumes 117 within primary storage 114 as well as the MAGIC database/segment name to be backed up. For example, in a CLARiiON system, the identification information for the clone volume 117 can include the CLARiiON ID number of the storage device 115 and the LUN number of the clone volume 117.

At 510, host computers 102 report back to the proxy host 170 that the split was successful and provides the identification information of the clone volumes 117 and the MAGIC database/segment name to be backed up. This information is received by the MAGIC ISB coordinator on the host computer manager 208, which allows the host computer manager 208 to create a snapshot work list of clone volumes 117 from which one or more snapshots is created based on a successful split from their respective production volumes 116. The host computer manager 208 sends the snapshot work list to the job sequencer 204.

The job sequencer 204 gets Integrated Disaster Recovery (IDR) relationships for the snapshot work list from resource database manager 206. The IDR relationships map out available snapshot storage spaces and assigns the available snapshot storage spaces to store a copy of one or more of the identified clone volumes 117 as a snapshot 118. The snapshots 118 can be configured as full or incremental copies. Full copy snapshots 118 will have the full copy of the clone volumes 117 while incremental copy snapshots 118 will have a full copy of the clone volumes 117 and then copy only the changed blocks on subsequent execution. Identification of the snapshots 118 corresponding to the clone volumes 117 (or IDR relationships) is required to create the snapshots 118 for the coherency group and prepare the system for disaster recovery and quick recovery with minimal loss of data.

Job sequencer 204 sends the IDR sessions identified in the snapshot work list to the snapshot manager 212. The snapshot manager 212 communicates with the primary storage 114 to identify which IDR sessions are available to ensure that the snapshot storage spaces that were identified at 510 exist and are available and returns the identification of the available IDR sessions to the job sequencer 204. Proxy host 170 uses the available IDR sessions to select from this list of snapshots 118 one or more IDR sessions to perform. This includes sending the available IDR session list from the job sequencer 204 to the resource database manager 206. The resource database manager 206 communicates with the ISB Manager configuration 202 to select one or more IDR sessions (i.e., the name of a snapshot 118, the snapshot storage space to which the snapshot will be saved, and the clone volume(s) from which the snapshot will be copied) to perform and sends these selections to the job sequencer 204 via the resource database manager 206 and this sequence is done iteratively for each snapshot 118 in the work list.

At 512, proxy host 170 creates one or more snapshots from the selected IDR sessions. This includes job sequencer 204 sending a command to snapshot manager 212 to start the selected one or more snapshots and also sends the IDR relations. The snapshot manager 212 communicates with the primary storage 114 to generate the snapshots from the clone volume(s) 117. In one embodiment, this includes creating a San Copy Session of one or more clone volumes 117, effectively copying the data from the one or more clone volumes 117 into the snapshot storage space(s) that was selected.

The primary storage 114 reports to the snapshot manager 212 when the snapshot(s) 118 are generated. After the snapshot(s) 118 are created, job sequencer 204 sends a commit IDR session command to the resource database manager 206 which updates the ISB manager configuration 202. Job sequencer 204 sends a save command to the backup and recovery manager 214 which communicates with the primary storage 114 to save the snapshot(s) to the identified snapshot storage space(s). This includes saving the snapshot on a storage device 115 in the primary storage 114, saving the snapshot in backup storage 154, or saving the snapshot to another storage device in a storage cluster of storage devices separate from the primary storage. After the snapshots are saved to an identified snapshot storage space, the proxy host 170 reports to the backup server 152 the location of the snapshots.

At 514, the backup server 152 records details of the snapshot backup process in its online indices 162.

At 516, the proxy host 170 prepares to finalize the ISB backup process. The backup and recovery manager 214 at the proxy host 170 receives the backup report and forwards the report to job sequencer 204. Job sequencer 204 sends a command to host computer manager 208 to reestablish the connection between the production volumes 116 and clone volumes 117 back to a normal state, along with the backup report. The MAGIC ISB coordinator in the host computer manager 208 sends a reconnect command to the host computers 102.

At 518, the host computers 102 send a request to primary storage 114 to resynchronize the production volumes 116 and clone volumes 117. Preferably, the resynchronize request sent from the host computers 102 in the coherency group 103 are sent at substantially the same time. The database management service 110 on the MAGIC platform 106 of the host computers 102 initiates reconnection between the production volumes 116 and clone volumes 117 back to a normal state and performs synchronization of any new data on the production volumes 116 that occurred during the backup operation to the clone volumes 117.

At 520, after synchronization is initiated, the host computers 102 return the status to the proxy host 170. This includes sending a report to the host computer manager 208 on the proxy host 170 that the synchronization is underway.

At 522, the proxy host 170 returns the status of the synchronization to the backup server 152.

Exemplary Recovery Operations

Figure 6:
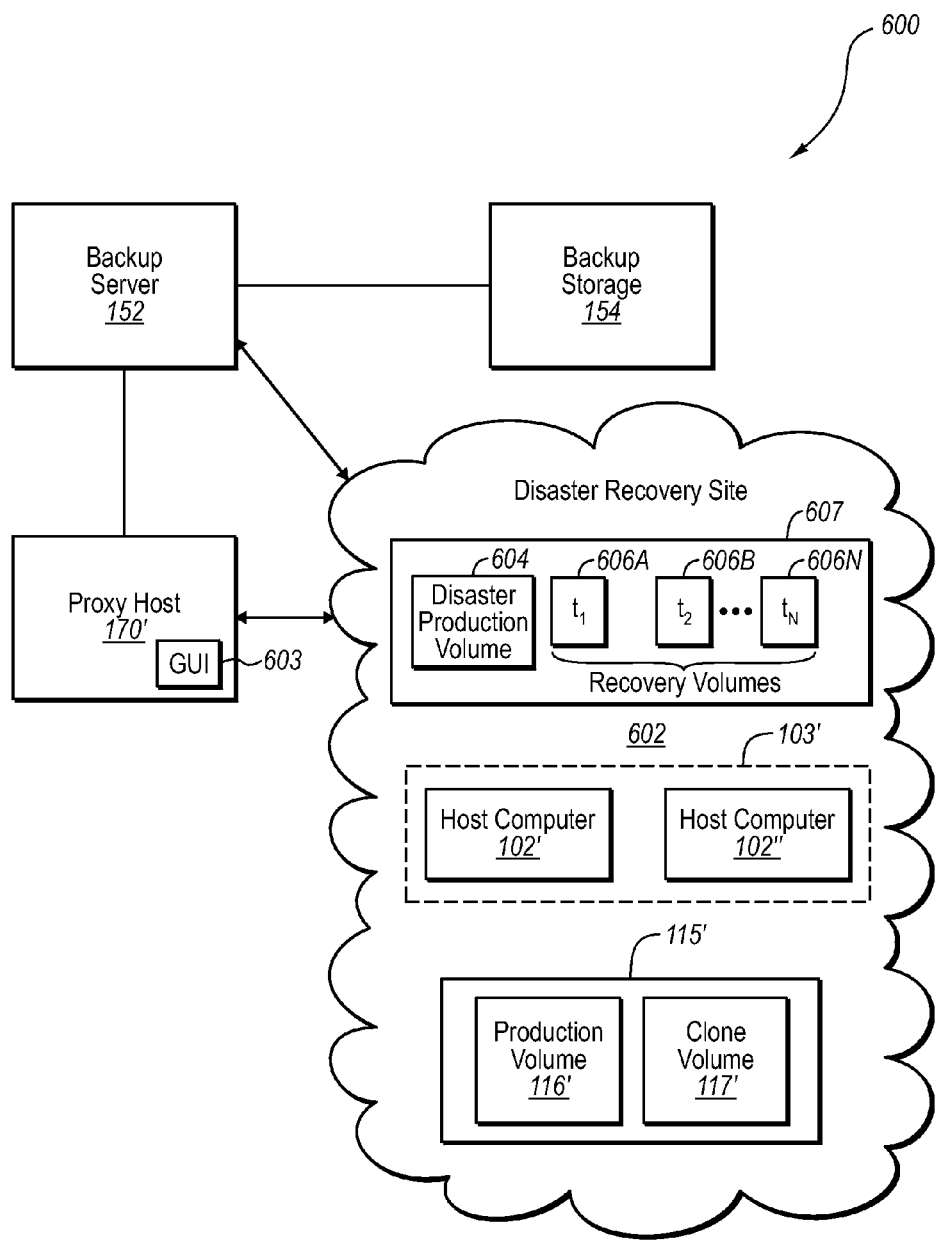
FIG. 6 illustrates an example of a system for performing recovery operations using ISB protocol in accordance with one embodiment of the present invention.

FIG. 6 illustrates an exemplary system 600 for performing recovery operations wherein like elements with regard to FIGS. 1A, 1B and/or 2 will be referred to with like reference numerals. As shown in FIG. 6, before a recovery operation, a disaster recovery site 602 can be created. A disaster recovery site 602 is necessary where storage device 115A or 115B containing production volume 116A, 116B and/or clone volume 117A, 117B has for some reason been rendered inoperable.

Disaster recovery site 602 includes one or more storage devices 607 including a disaster production volume 604 and one or more recovery volumes 606A, 606B, 606C. The recovery volumes 606 are copies of a clone volume 117. Alternatively, the recovery volumes 606 are copies of snapshots 118 taken at different points in time. In one embodiment, disaster recovery site 602 is created by backup server 152 accessing data in backup storage 154 and recovering data into one or more recovery volumes 606. This is referred to as "pre-restore" period.

In one embodiment, an existing proxy host 170 can be used to facilitate recovery of a primary storage. Alternatively, it may be desirable to provide a recovery proxy host 170' in the event that the existing proxy host 170 is unavailable for recovery. Where a recovery proxy host 170' is used, a graphical user interface 603 can be restored or recovered to proxy host 170'. Recovery of GUI 603 involves recovery of the resource database manager 206 and ISB Manager configuration 202. These will be used to browse the client file indexes 158 for the backups of the clone volumes 117 and/or snapshots 118 so that the user knows what information is available for recovery. The graphical user interface 603 allows a user to select the volumes that need to be restored, data to be used to recover the data that was lost, and how the data should be restored.

Once the disaster recovery site 602 is established, backup server 152 communicates with proxy host 170, placing the proxy host 170' in communication with the disaster recovery site 602. As shown in FIG. 6, disaster recovery site 602 also includes recovery host computers 102', 102" and a recovery storage device 115' that can be configured to function analogous to the host computer 102 and storage device 115. This allows the proxy host 170 to perform various operations on the pre-restored information in storage device 607 to configure the storage device 115' to hold a recovery production volume 116' and a recovery clone volume 117' that can be operational with host computers 102', 102", which will be described further below. Backup server 152 then may or may not disconnect from direct communication with the disaster recovery site 602. In the event that backup server 152 does disconnect from direct communication with the disaster recover site 602, backup server 152 is able to communicate with the disaster recovery site 602 via proxy host 170'.

Figure 7:
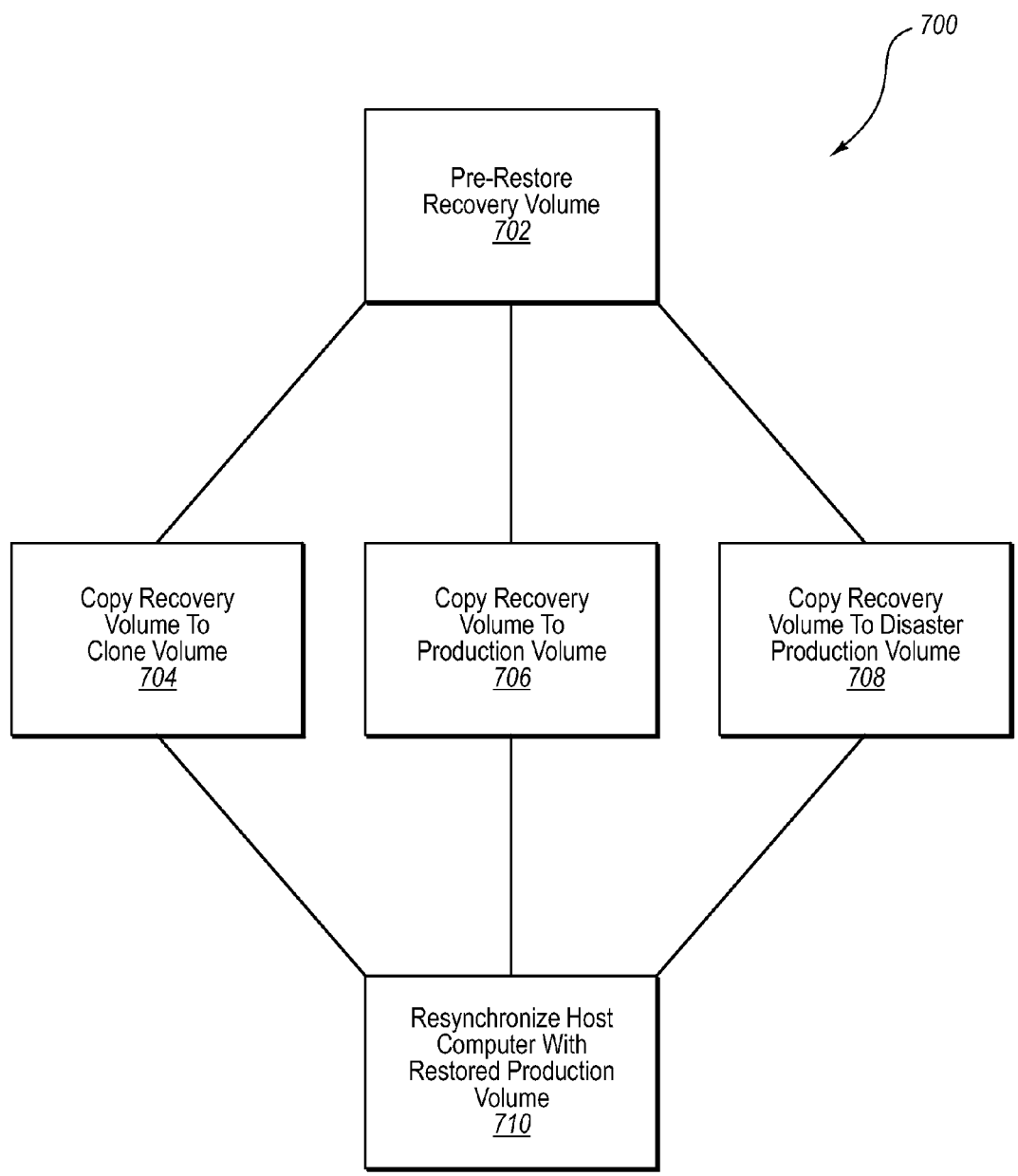
FIG. 7 illustrates an example of a method for performing recovery operations in accordance with one embodiment of the present invention.

FIG. 7 illustrates an exemplary method 700 for recovering data from a disaster recovery site 602, wherein the recovered data can be recovered to various locations and in various different ways. At 702, a recovery volume 606 is pre-restored at disaster recovery site 602. This includes copying data from a backup of a clone volume 117 from backup storage 154 or one of the snapshots 118 into one of the disaster production volume 604 and/or recovery volumes 606. Also, 702 includes restoring a graphical user interface 603 on the proxy host 170'.

As illustrated in FIG. 7, in one embodiment, at 704, a recovery volume 606 from storage device 607 on disaster recovery site 602 is copied to recovery clone volume 117' on recovery storage device 115' of disaster recovery site 602. Alternatively, at 706, a recovery volume 606 from storage device 607 is copied to recovery production volume 116' on recovery storage device 115' of the disaster recovery site 602. In still another embodiment, at 708, the data from a recovery volume 606 is copied to disaster production volume 604.

Thus, if the user selects copying of recovery volume 606 to disaster production volume 604 (708), the user can configure the storage device 607 to act as a new primary storage, with the recovery volume 606 acting as a clone volume to the disaster production volume 604. Alternatively, if the user selects copying of recovery volume to recovery production volume 116' (706) and recovery clone volume 117' (704), then the recovery storage device 115' can act as the new primary storage.

At 710, the recovery storage device 115' or 607 (depending on the recovery scenario used) is resynchronized with recovery host computers 102', 102" to form a recovery coherency group 103'. This can include proxy host 170 connecting the recovery host computers 102', 102" with whichever storage device acts as the new primary storage so that the recovery host computers 102', 102" can proceed to use the new production volume and clone volume to store data from a recovery production application located on each of the recovery host computers. This can further include connecting the disaster production volume 604 with the recovery/clone volume 606 or, alternatively, connecting the recovery production volume 116' and recovery clone volume 117' using ISB protocol. In one embodiment, connecting of the production volume 604 and/or 116' to the recovery host computer 102', 102" occurs at substantially the same time for all of the host computers in the recovery coherency group 103'.

In summary, the proxy host 170 facilitates communication between the MAGIC platform 106 on the host computers 102 of a coherency group 103 and the backup server 152 making backup and recovery functions that were previously unavailable to the production volume 116 and clone volume 117 now possible. These functions include scheduling backups of clone volume 117 to a backup storage 154, scheduling creation of snapshots 118 at various points in time. Performing remote recovery of data from the saved clone volumes 117 and/or snapshots 118 is also facilitated by proxy host 170. In addition, the backup server 152 maintain records of backup/snapshot operations and locations of backup/snapshots in its online indices.

Embodiments included dedicated devices or systems that include both hardware and/or software components. Embodiments within the scope of the present invention also include computer readable media having executable instructions or data fields stored thereon. Such computer readable media is any available media which is accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which is used to store the desired executable instructions or data fields and which is accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Those skilled in the art will appreciate that the invention are practiced with other computer system configurations, including hand-held devices, multi-processor systems, microprocessor-based or programmable customer electronics, network PCs, minicomputers, mainframe computers, and the like. The invention may also be practiced in distributed computing environments where tasks are performed by remote processing devices that are linked through a communications network. In a distributed computing environment, program modules are located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing scheduled backups of data generated by one or more production applications operating on a first platform located on two or more host computers in a coherency group, the first platform operating on an operating system of each of the two or more host computers the data being stored on one or more production volumes in a primary storage that is remote from the two or more host computers, the first platform using a first protocol to create one or more clone volumes of the production volume, the operating system booting off a local hard drive of each of the two or more host computers and the first platform booting off of the one or more production volumes in the remote primary storage such that the operating system of each of the two or more host computers cannot access the first platform or the one or more production applications to perform backup operations, the method comprising:

receiving a backup command from a backup server at a proxy host that is seperate from the two or more host computers in the coherency group;

sending a split command to the two or more host computers in a coherency group to initiate splitting of one or more production volumes and one or more clone volumes using the first protocol, the two or more host computers being instructed to perform the split at substantially the same time, wherein the split command allows the proxy host to communicate directly with the primary storage including the one or more production volumes and the one or more clone volumes;

receiving an identification of the one or more clone volumes at the proxy host;

initiating the one or more clone volumes for surfacing and mounting from the proxy host; and initiating a backup of the surfaced and mounted one or more clone volumes to a backup storage from the proxy host.

2. The method as recited in claim 1, further comprising sending a reconnect command to the two or more host computers to initiate reconnection of the one or more production volumes and the one or more clone volumes using the first protocol, the two or more host computers being instructed to perform the reconnection at substantially the same time.

3. The method as recited in claim 2, further comprising sending a synchronization command to the two or more host computers to initiate synchronization of the one or more production volumes and the one or more clone volumes, the two or more host computers being instructed to perform the synchronization at substantially the same time.

4. The method as recited in claim 1, wherein sending a split command to two or more host computers in a coherency group to initiate splitting of one or more production volumes and one or more clone volumes using the first protocol comprises sending a quiescing command to a production application on each of the two or more host computers, the two or more host computers being instructed to perform the quiescing at substantially the same time.

5. The method as recited in claim 1, further comprising sending information about the backup of the surfaced and mounted one or more clone volumes to the backup server to enable the backup server to store information about the backup in an online indices for tracking the backup of the one or more clone volume.

6. The method as recited in claim 1, wherein sending a split command to two or more host computers in a coherency group to initiate splitting of one or more production volumes and one or more clone volumes using the first protocol comprises communicating with an application programming interface on each of the two or more host computers.

7. The method as recited in claim 1, wherein receiving a backup command from a backup server comprising receiving a backup command according to a predetermined backup schedule.

8. The method as recited in claim 1, wherein the first platform is a MAGIC platform.

9. The method as recited in claim 1, wherein the first protocol is a ISB protocol.

10. A method for performing scheduled backups of data generated by one or more production applications operating on a first platform located on two or more host computers in a coherency group, the first platform operating on an operating system of each of the two or more host computers, the data being stored on one or more production volumes in a primary storage that is remote from the two or more host computers, the first platform using a first protocol to create one or more clone volumes of the production volume, the operating system booting off a local hard drive of each of the two or more host computers and the first platform booting off of the one or more production volumes in the remote primary storage such that the operating system of each of the two or more host computers cannot access the first platform or the one or more production applications to perform backup operations the method comprising:
- receiving a backup command from a backup server at a proxy host that is seperate from the two or more host computers in the coherency group;
- sending a split command to the two or more host computers in a coherency group to initiate splitting of one or more production volumes and one or more clone volumes using the first protocol, the two or more host computers being instructed to perform the split at substantially the same time, wherein the split command allows the proxy host to communicate directly with the primary storage;
- initiating creation of a snapshot from the one or more clone volumes from the proxy host; and
- initiating storing of the snapshot in the primary storage from the proxy host.

11. The method as recited in claim 10, further comprising sending a reconnect command to the two or more host computers to initiate reconnection of the one or more production volumes and the one or more clone volumes using the first protocol, the two or more host computers being instructed to perform the reconnection at substantially the same time.

12. The method as recited in claim 11, further comprising sending a synchronization command to the two or more host computers to initiate synchronization of the one or more production volumes and the one or more clone volumes, the two or more host computers being instructed to perform the synchronization at substantially the same time.

13. The method as recited in claim 10, wherein sending a split command to two or more host computers in a coherency group to initiate splitting of one or more production volumes and one or more clone volumes using the first protocol comprises sending a quiescing command to a production application on each of the two or more host computers, the two or more host computers being instructed to perform the quiescing at substantially the same time.

14. The method as recited in claim 10, further comprising sending information about the creation of the snapshot to the backup server to enable the backup server to store information about the creation of the snapshot in an online indices for tracking the creation of the snapshot.

15. The method as recited in claim 10, wherein sending a split command to two or more host computers in a coherency group to initiate splitting of one or more production volumes and one or more clone volumes using the first protocol comprises communicating with an application programming interface on each of the two or more host computers.

16. The method as recited in claim 10, wherein receiving a backup command from a backup server comprising receiving a backup command according to a predetermined backup schedule.

17. The method as recited in claim 10, wherein the first platform is a MAGIC platform.

18. The method as recited in claim 10, wherein the first protocol is a ISB protocol.

* * * * *